United States Patent [19]
Bonvin

[11] 3,810,637
[45] May 14, 1974

[54] SHAFT PACKING

[75] Inventor: Jacques Bonvin, Colombes, France

[73] Assignee: Societe Internationale De Mecanique Industrielle, S.A., Luxemburg, Luxembourg

[22] Filed: Jan. 14, 1972

[21] Appl. No.: 217,800

[52] U.S. Cl............ 277/96, 29/196.6, 117/93.1 PF
[51] Int. Cl.............................................. F16j 15/34
[58] Field of Search .......... 277/96, 235 A; 117/130, 117/93.1 PF, 205, 205.1; 29/196.6

[56] References Cited
UNITED STATES PATENTS

| 2,714,563 | 8/1955 | Poorman et al. ................ 117/105.1 |
| 3,075,066 | 1/1963 | Yenni et al.................... 117/93.1 PF |
| 3,211,548 | 10/1965 | Scheller et al. .............. 117/93.1 PF |
| 3,539,192 | 11/1970 | Prasse ......................... 117/93.1 PF |
| 3,617,349 | 11/1971 | Prasse............................ 277/235 A |
| 3,725,017 | 4/1973 | Prasse............................... 29/196.6 |
| 3,642,517 | 2/1972 | Faber................................. 29/196.6 |
| 3,646,993 | 5/1970 | Rice et al..................... 117/93.1 PF |
| 3,749,412 | 5/1972 | Lingley ................................. 277/96 |
| 3,086,782 | 4/1963 | Peickii et al. ..................... 277/96 R |
| 3,573,874 | 4/1971 | Hill................................. 277/235 A |

Primary Examiner—Louis R. Prince
Assistant Examiner—Robert I. Smith
Attorney, Agent, or Firm—Howson and Howson

[57] ABSTRACT

Shaft packing wherein the sealing ring and/or the counter-ring are coated with a thin layer of refractory or non-refractory material deposited thereon by using a plasma blowpipe.

3 Claims, 7 Drawing Figures

SHAFT PACKING

FIELD OF THE INVENTION

This invention relates in general to shaft packings and has specific reference to improvements in or relating to such packings.

BACKGROUND OF THE INVENTION

Sliding contact packings subjected to a lateral frictional contact and notably shaft packings or seals adapted to be interposed between a fixed member and a rotary member, such as a casing in which one portion of a rotary shaft is adapted to rotate, the other portion of this shaft emerging from this casing, are made as a rule from conventional refractory materials.

These friction members have so far proved to be satisfactory, in the whole, their capacity to withstand considerable stress being adequate for most applications; however, the present trend towards increasingly higher velocities of rotation applied to such shafts is most likely to jeopardize the friction elements incorporated in these packings, considering the considerable stress exerted thereon.

Of course, one could use for making these friction elements other materials having a greater resistance to the stress produced under actual service conditions, with respect to the above-mentioned refractory materials; thus, chromium oxide or tungsten carbide could be used in the manufacture of these elements; however, the cost of packings incorporating such friction elements would become prohibitive and in addition their resistance to frictional efforts might still prove inadequate.

SUMMARY OF THE INVENTION

To avoid these inconveniences, the present invention provides a packing characterized in that at least one of its friction elements consists of a metal spring coated with a thin film of refractory or non-refractory material deposited thereon by using a plasma blowpipe.

In fact, it is known to deposit on a metal support a refractory or non-refractory material introduced in the form of fine powder into a jet of gaseous propellant at very high temperature (plasma).

By properly rotating the workpiece to be coated under the gaseous jet loaded with said particles then in their molten condition this workpiece will collect a very thin layer (of the order of about 0.008 to 0.025 inches) of refractory material, this layer adhering strongly to the metal substratum.

As a material suitable for performing this deposition by using a plasma blowpipe, chromium oxide, with or without the addition of cobalt, tungsten carbide, aluminas, or suitable mixtures of these substances, may be used.

The Applicant also found that particularly satisfactory results could be obtained by associating a sealing ring or a counter-ring, consisting of a plasma coated metal support, with a counter-ring, or a sealing ring of another material.

Thus, notably, considering the use of a ring coated with a material deposited by using a plasma gun, said counter-ring may advantageously consist of alumina; alternatively, if it is the counter-ring that is to be coated by using said plasma gun, the sealing ring proper may advantageously consist of carbon.

The metal support may consist either of a solid member or of a pressed piece.

BRIEF DESCRIPTION OF THE DRAWING

Reference will now be made to the attached drawing illustrating diagrammatically by way of example a few typical forms of embodiment of this invention. In the drawing.

DESCRIPTION OF THE PREFERRED EMBODIMENT

Figure 1:
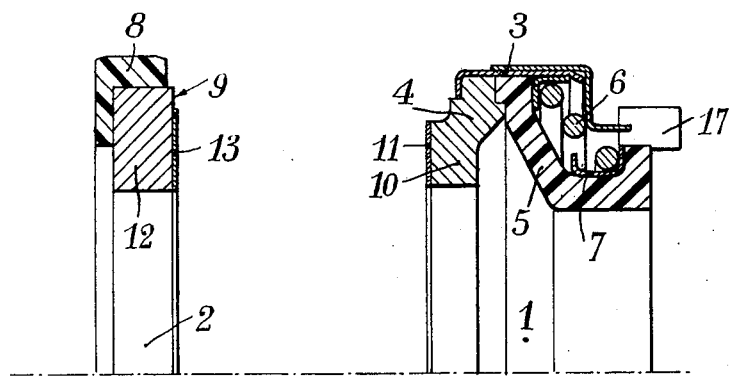
FIG. 1 is a radial section showing the two component elements of a first form of embodiment of a packing according to this invention.

The packing illustrated in FIG. 1 comprises as conventional a sealing or packing ring proper 1 and a counter-ring 2; the former actually consists of a case 3 in which a friction member 4 and a diaphragm 5 are fitted and constantly urged by a spring 6 reacting against an annular member 7 towards the counter-ring 2. This counter-ring 2 consists in this example of an assembly comprising an annular member 8 formed with an end inner flange, of rubber or other suitable elastomeric material, adapted to constitute a flexible seal, and a friction member 9 fitted in said annular member 8; the friction member 4 of sealing ring 1 consists of a relatively thick or massive metal element 10 having its outer face perpendicular to the axis coated with a layer 11 of refractory or non-refractory material deposited thereon by using a plasma gun; similarly, the friction member 9 of counter-ring 2 comprises a relatively thick or solid metal element 12 having its outer face perpendicular to the axis and registering with the face layer 11 of ring 1 also coated with material 13 by using a plasma gun; this packing can be mounted as conventional between a casing 14 and a shoulder 15 formed to this end on a rotary shaft 16 extending through the wall of said casing 14, the annular reaction member 7 being formed with integral radial fins or teeth acting as driven members when in the assembled condition these fins engage radial notches 18 provided to this end in the annular face, perpendicular to the axis, of shoulder 15 (FIG. 2).

Figure 2:
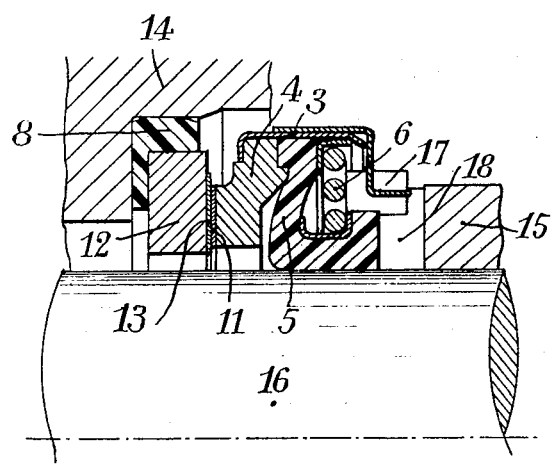
FIG. 2 is a similar view showing the same packing fitted between the wall of a casing and a shoulder formed on a rotary shaft projecting from this casing.
Figure 3:
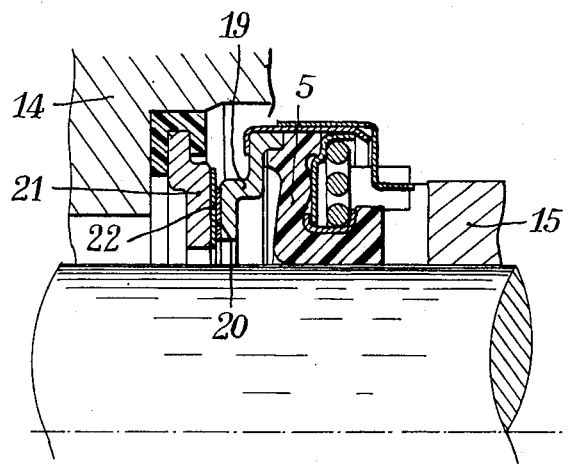
FIG. 3 is a view similar to FIG. 2 showing a modified form of embodiment.

The shaft packing illustrated in FIG. 3 is similar to the preceding one with the only difference that the friction member 4 consists of a washer 19 of pressed metal sheet having one face coated with a layer of material 20 deposited by using a plasma gun, the counter-ring consisting of another washer of pressed sheet metal 21 having one face coated with a layer of material 22 deposited by using a plasma gun, in lieu of the solid members 10 and 12 of the structure shown in FIGS. 1 and 2.

Figure 4:
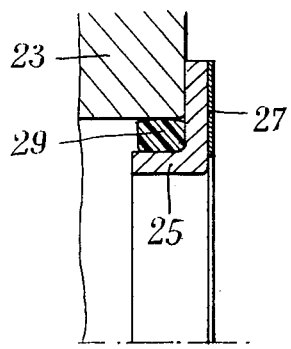
FIGS. 4 and 5 are axial radial sections showing packing elements obtained in a different manner but still according to the principles of this invention.
Figure 5:
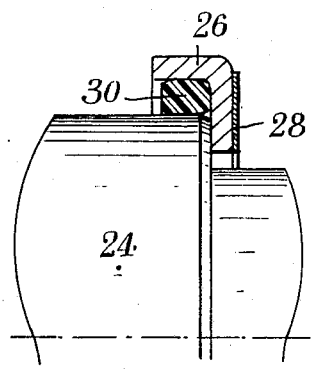

FIGS. 4 and 5 illustrate likewise modified assemblies of the counter-rings in the casing 23 (FIG. 4) and on shaft 24 (FIG. 5) by means of pressed workpieces 25 and 26, respectivemy, coated with a suitable material 27, 28 deposited by using a plasma gun, with the interposition of resilient seals 29 and 30.

Figure 6:
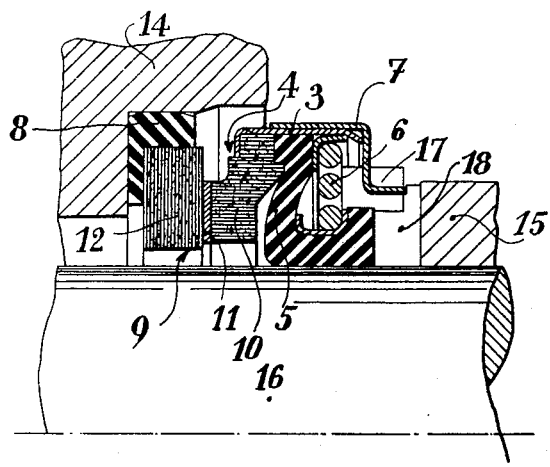
FIGS. 6 and 7 are views similar to FIG. 2 showing improved shaft packings constructed according to the teachings of this invention.
Figure 7:
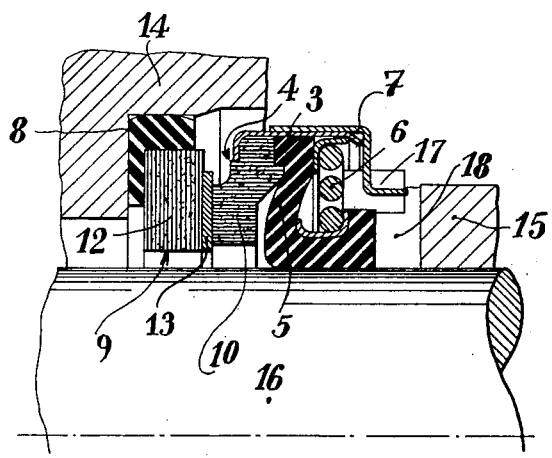

The improved shaft packings illustrated in FIGS. 6 and 7 comprise as usual a sealing ring 1 and a counter-ring 2, the sealing ring comprising a case 3 in which a friction member 4 and a diaphragm 5 are fitted, a compression spring 8 constantly urging said ring against the counter-ring by reacting against an annular member 7; the counter-ring comprises a flanged ring 8 of rubber or other suitable elastomeric material, adapted to constitute the flexible seal of the assembly, and having the friction member 9 fitted therein.

In the form of embodiment illustrated in FIG. 6 the friction member 4 consists of a solid metal element 10 coated with a fine layer of material deposited by using a plasma gun, as shown at 11; the friction member 12 consists of alumina; this packing may be disposed as conventional between a casing 14 and a shoulder 15 provided to this end on a rotary shaft 16 extending through the wall of casing 14, the annular member 7 being formed with integral radial fins or teeth 17 adapted to constitute driven elements engaging radial notches 18 formed to this end in the front face of shoulder 15.

In the form of embodiment illustrated in FIG. 7 the counter-ring comprises a metal member 12 coated with a thin layer of suitable material deposited by using a plasma gun, as shown at 13; in this case, the friction member 4 may advantageously consist of carbon.

Although various forms of embodiment of this invention have been shown and described herein, it will readily occur to those conversant with the art that various modifications may be brought thereto without departing from the basic principle of the invention, as set forth in the appended claims.

What is claimed is:

1. Shaft packing adapted to constitute an axial seal comprising a sealing ring and a counter ring fitted between a fixed member and a rotary member, for example a casing in which one portion of a rotary shaft is adapted to rotate, another portion of said shaft projecting from said casing, and wherein at least one of the friction members comprises a metal support coated with a relatively thin layer of refractory or non-refractory material deposited thereon by using a plasma blowpipe, characterized in that the material deposited by using said plasma blowpipe consists of chromium oxide, cobalt and tungsten carbide.

2. Shaft packing according to claim 1, characterized in that the sealing ring thereof is coated with a thin layer of material deposited by using a plasma blowpipe, the counter-ring consisting of alumina.

3. Shaft packing according to claim 1, characterized in that the counter-ring is coated with a thin layer of material deposited by using a plasma blowpipe, the ring consisting of carbon.

* * * * *